No. 857,810. PATENTED JUNE 25, 1907.
G. KOHLHAAS.
MICROMETER GAGE.
APPLICATION FILED JUNE 6, 1904.
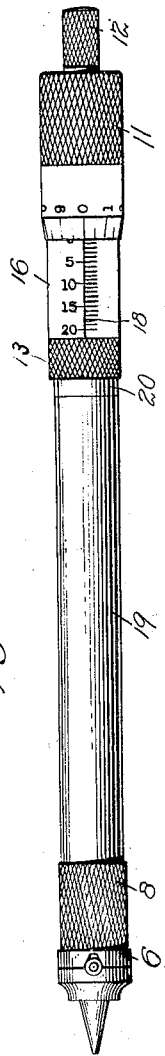
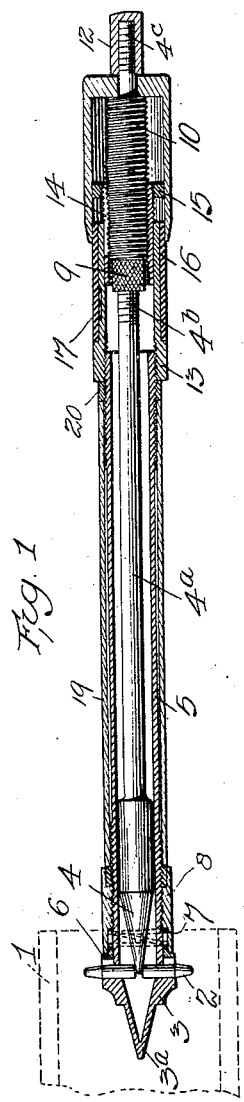
ATTEST:  
INVENTOR.  
GEORGE KOHLHAAS.

UNITED STATES PATENT OFFICE.

GEORGE KOHLHAAS, OF WASHINGTON, DISTRICT OF COLUMBIA.

MICROMETER-GAGE.

No. 857,810.          Specification of Letters Patent.          Patented June 25, 1907.

Application filed June 6, 1904. Serial No. 211,641.

*To all whom it may concern:*

Be it known that I, GEORGE KOHLHAAS, a citizen of the United States, residing at Washington, District of Columbia, have invented certain new and useful Improvements in Micrometer-Gages, of which the following is a specification.

My invention relates to improvements in micrometer gages or instruments for determining with as perfect accuracy as possible the interior diameter of metal tubes and borings.

I have aimed in devising the present instrument, to produce a device in which such measurement may be made with the greatest nicety, and the slightest variation in size accurately determined.

A further object has been to provide a single instrument of small and compact form, which shall be capable of use in determining the internal diameter of tubes or borings of very widely varying size.

Another object is to provide a device by which not only may a measurement be taken at the mouth of a tube or boring, but which may be projected to a considerable extent within such opening, thereby enabling me to accurately determine whether or not there be any internal taper and if yea, then the amount of such taper.

Finally I have aimed to produce an instrument which shall be simple, durable and effective, which may be readily adjusted, and which may be produced at a cost which will place it within the reach of the many workmen requiring or desiring such a device.

With these objects in view the invention includes the features of construction and arrangement of parts hereinafter described and particularly pointed out in the claims.

I have illustrated the invention in the accompanying drawings in which—

Figure 1 is a section view, and Fig. 2 a side elevation.

Referring by reference characters to these figures, the ordinal 1 indicates in dotted lines the end of a tube which is representative of any tube or boring, the diameter of which is to be determined.

As will be observed, the instrument is of considerable length with a minimum diameter, being almost pencil-shaped so that it may be easily manipulated and readily inserted to a considerable extent into a very small tube or opening. The measuring is accomplished by providing pins 2 which are guided as hereinafter described in a head 3, and are forced outward to cause their outer ends to contact with the inner periphery of the tube by a cone 4, which is moved longitudinally by the means hereinafter described. The head 3 is carried at the end of a tube 5, which forms the body of the instrument, and the forward end of the head is preferably closed, as indicated at 3ª, forming a conical pocket or recess to receive the cone 4 and to effectually exclude all dirt. The pins 2 pass through openings in the head and bear at the front against semi-circular recesses in the enlarged portion or flange of the head. A movable collar 6 encircles the plain portion of the tube immediately in rear of the head or flange, and this collar is provided with angular recesses, as shown, which bear against the rear sides of the pins. The collar is pressed up against the pins by a helical spring 7, which encircles the plain portion of the tube or sleeve 5 in rear of the head and is compressed between the collar 6 and a collar 8 which is threaded on to the tube 5. The collar 8 preferably has a recessed portion so that it overlaps the spring and excludes dirt, this overlapping portion extending up and overlapping a small flange of the collar 6, as clearly indicated in the sectional view. The collar 8 is adapted to be screwed up against the collar 6 so as to force the latter up tightly against the pins and hold them firmly while measurements are being taken.

After a measurement has been taken and it is desired to readjust the parts the collar 8 is slightly unscrewed which relieves the collar 6 from the strong clamping action of the collar 8 but yet leaves the spring 7 sufficiently compressed to exert enough pressure on the collar 6 to keep the pins from dropping out.

By making the recessed portions of the collar angular, as shown, I provide practically a three point bearing and thus enable the pins to be much more accurately and firmly held than if a semi-circular recess were provided in both the head and the collar. The cone 4 has a stem 4ª, which extends back and is threaded at 4ᵇ to receive a similarly threaded collar 9, which forms an adjustable stop for an externally threaded sleeve 10. An external sleeve 11 has an opening at its rear end, as shown, through which the rear end 4ᶜ of the rod 4ª passes, and a nut 12 threaded thereon serves to clamp the head of the sleeve 11 firmly against the end of the externally threaded sleeve 10. A sleeve 13 has an interior thread to engage the exterior threaded rear portion of the tube 5 and within the sleeve 13 at the opposite end is firmly held a sleeve 14 which is threaded upon its interior to engage the exterior thread upon the sleeve 10, and is split at its rear end and provided with a slightly tapered exterior threaded portion which is engaged by a threaded collar 15 so that by screwing upon this collar, the split portion of the sleeve 14 may be tightened upon the threaded portion 10. The sleeve 13 has a reduced portion which has a smooth exterior upon which is slipped a second sleeve 16 which is frictionally held by a spring 17 seated in a recess in the sleeve 13, and this second sleeve has a longitudinal line 18 with graduations thereon running from zero upward toward the rear end. The forward end of the sleeve 11 is tapered to a comparatively thin edge and its diameter is such that it loosely fits around the exterior of the sleeve 16. Its tapered edge is provided with longitudinal graduations which are suitably numbered around the periphery of the sleeve, as shown.

In order to prevent the warmth of the hand from heating the tube unduly, and thus causing expansion of the parts and consequent inaccuracy, I provide a surrounding sleeve or hand grasp portion 19 of wood, gutta percha, or the like, which is confined between the sleeve 8 at the forward end which is preferably recessed, as shown, to encircle the end of the hand hold portion, and a threaded sleeve 20 at the rear portion.

From the foregoing description it is thought the operation and advantages of my invention will be apparent, but the operation may be briefly stated to be as follows. Supposing it is desired to accurately determine the interior diameter of a tube or boring, such as indicated at 1 in Fig. 1, the head of the instrument is inserted into the mouth of the opening, as shown. The sleeve 11 is then rotated to the right, which causes the threaded sleeve 10 to advance. By reason of its threads engaging the interior threads of the sleeve 14 this causes the cone 4 to be pushed forward between the inner ends of the pins 2. The inner ends of these pins are accurately ground to a slight taper so that their rotation on their axes will not impair the accuracy of the instrument. Thus as the cone is pushed forward the pins are accurately moved outward. As the taper of the cone is not very great or abrupt the pins will only be moved out slowly and gradually. Furthermore, it can be seen that the movement of the cone is very slow, owing to the fact that its forward movement is due to the engagement of the threaded sleeve 10 with the sleeve 14. Thus a considerable amount of rotary movement may be imparted to the sleeve 11 without resulting in moving the pins 2 outward to more than an infinitesimal amount. By the provision of the appropriate scales of the sleeve 16 and 11, as shown in Fig. 2, I am enabled to determine the adjustment down to the smallest fraction of an inch.

It will be readily seen that the range of movement of the pins is necessarily small. In order to enable tubes or borings of great variation in size to be measured, it will be apparent that all that is necessary is to remove the pins 2 and to substitute therefor other pins of greater or less length, according to circumstances, and with each instrument I provide a plurality of sets of pins designed to meet all the requirements of the trade.

It will be understood that, while I have only described the use of the instrument in determining the interior diameter of a tube or boring, if it is desired to determine whether it be tapered and the extent of the taper, all that is necessary is, after having taken the measurement at the mouth, to push the instrument farther in, and in a similar manner I may take the measurement at another point or points and to measure snap gages, parallel surfaces and the like.

Instead of adjusting the micrometer device by the parts 9 and 12, adjustment may be effected by turning the sleeve 13 on the tubular body portion and locking the same in adjusted position by means of the collars 20 and 20×.

Having thus described my invention, what I claim is:—

1. In combination, a tubular body portion having a flanged head with semi-circular recesses in said head, a collar having angular recesses opposing said semi-circular recesses, pins guided in said semi-circular and angular recesses, means for pressing the collar against the pins, and means for forcing the pins outwardly, substantially as described.

2. In combination a tube, radially arranged pins at one end thereof, a cone extending between said pins and having a stem extending through the tube to the opposite end, an exteriorly threaded sleeve secured to the rear end of the stem, an interiorly threaded sleeve connected to the rear end of the tube and having its interior threads engaged by the exteriorly threaded sleeve, and an operating sleeve rigidly connected to the rear end of the stem and having its forward end graduated and encircling a graduated member at the rear end of the tube, substantially as described.

3. In combination a tube, radially arranged pins at one end thereof, a cone extending between said pins and having a stem extending through the tube to the opposite end, an exteriorly threaded sleeve adjustably secured to the rear end of the stem, a sleeve threaded upon the rear end of the tube and an interiorly threaded sleeve carried thereby and having its interior threads engaged by the exteriorly threaded sleeve, and an operating sleeve connected to the rear end of the stem and having its forward end graduated and encircling the sleeve at the rear end of the tube, said last named sleeve having graduations, substantially as described.

4. In combination a tube, radially arranged pins at one end thereof, a cone extending between said pins and having a stem extending through the tube to the opposite end, an adjustable collar on said stem, an exteriorly threaded sleeve abutting against said collar, an operating sleeve on the rear end of the stem abutting against said exteriorly threaded sleeve and having its forward end graduated, a clamping nut on the rear end of the stem for clamping said operating sleeve, a sleeve threaded on the rear end of the tube, an interiorly threaded sleeve carried thereby engaging the exteriorly threaded sleeve, and a graduated sleeve encircling the sleeve on the rear end of the tube and projecting within the operating sleeve and lying between the micrometer means and the head, substantially as described.

5. In combination a tubular body portion having a flanged head, a collar opposed to said head, pins guided between said parts, means for forcing the collar toward the flange of the head to clamp the pins firmly, and means for gradually forcing the pins outwardly, substantially as described.

6. In combination a tubular body portion having a flanged head, a clamping collar opposed to said head, pins guided between said parts, a collar for forcing said collar against the pins to clamp them, means for forcing the pins gradually outward, and a spring for holding said pins when the forcing collar is disengaged from the clamping collar, substantially as described.

7. In a device of the character described, a tubular body portion having radially arranged measuring devices slidably carried at one end thereof, micrometer controlled means at the other end thereof having connections extending through the tube for operating said members, a non-conducting hand grasp portion encircling the tube and extending between the measuring devices and the micrometer means, and sleeves or ferrules on said tube for holding the non-conducting hand grasp portion in place, substantially as described.

8. In combination in an instrument of the class described, a tubular body portion having a head, pins movable radially of the head, means encircling the tubular body for holding the pins to the head by adjustable frictional pressure, and to permit the removal of the pins and means for forcing the pins outwardly, extending through said body portion, said means having longitudinal movement while the tubular body remains stationary substantially as described.

9. In combination, in an instrument of the class described, a tubular body having a head, pins guided in the head, means encircling the body portion, and adjustable in relation to the head, to hold the pins, and means for operating the pins extending through the tubular body, substantially as described.

10. In combination, in an instrument of the class described, the pins, a tubular body portion having a head a sleeve threaded on the outside of the tubular body portion for aiding in holding the pins, and means passing through the body portion for operating the said pins, substantially as described.

11. In combination, in an instrument of the class described, a tubular body having a head, pins movable radially therein, a stem extending through the hollow body, and having means for spreading the pins, a micrometer sleeve, a screw threaded sleeve associated with the micrometer sleeve, and means for adjusting the screw threaded sleeve, and micrometer sleeve in relation to the stem, substantially as described.

12. In combination, in a micrometer gage, a hollow body portion having a head, pins guided to move radially in said head, a rod extending through the hollow body portion, micrometer means on the said rod, an internally threaded sleeve on the body portion and carrying the micrometer means, a hand hold sleeve on the body portion, and an adjustable collar for holding the said hand hold sleeve in place and also serving to lock the internally threaded sleeve, substantially as described.

In testimony whereof, I affix my signature in presence of two witnesses.

GEORGE KOHLHAAS.

Witnesses:
HENRY E. COOPER,
L. B. MIDDLETON.